United States Patent
Morales Restrepo

(10) Patent No.: US 12,280,329 B2
(45) Date of Patent: Apr. 22, 2025

(54) CONDENSATION DEVICE COMPRISING A STIRRER IN A CHAMBER FOR COLLECTING THE CONDENSATE

(71) Applicant: Juan Camilo Morales Restrepo, Medellín (CO)

(72) Inventor: Juan Camilo Morales Restrepo, Medellín (CO)

(*) Notice: Subject to any disclaimer, the term of this patent is extended or adjusted under 35 U.S.C. 154(b) by 636 days.

(21) Appl. No.: 17/416,408

(22) PCT Filed: Dec. 18, 2019

(86) PCT No.: PCT/IB2019/061032
§ 371 (c)(1),
(2) Date: Jun. 18, 2021

(87) PCT Pub. No.: WO2020/128910
PCT Pub. Date: Jun. 25, 2020

(65) Prior Publication Data
US 2022/0062787 A1   Mar. 3, 2022

(30) Foreign Application Priority Data
Dec. 18, 2018   (CO) ................... NC2018/0013728

(51) Int. Cl.
*B01D 5/00* (2006.01)

(52) U.S. Cl.
CPC ......... *B01D 5/0024* (2013.01); *B01D 5/0012* (2013.01); *B01D 5/006* (2013.01); *B01D 2202/00* (2013.01)

(58) Field of Classification Search
CPC . D21D 1/306; D21D 1/30; D21D 1/22; B02C 7/12; B01D 5/0024; B01D 5/0012; B01D 5/006; B01D 2202/00
See application file for complete search history.

(56) References Cited

U.S. PATENT DOCUMENTS

| | | | | |
|---|---|---|---|---|
| 3,834,133 A * | 9/1974 | Bow | ........................ | F28B 3/04 |
| | | | | 261/36.1 |
| 3,960,668 A * | 6/1976 | Rush | ........................ | C02F 1/14 |
| | | | | 202/185.1 |
| 4,053,006 A * | 10/1977 | Tkac | ........................ | F16J 15/40 |
| | | | | 202/205 |

(Continued)

FOREIGN PATENT DOCUMENTS

| CN | 110314497 A * | 10/2019 | |
|---|---|---|---|
| EP | 3741741 A1 * | 11/2020 | ............. B01D 1/065 |

(Continued)

*Primary Examiner* — Stephen Hobson
(74) *Attorney, Agent, or Firm* — The Morales Law Firm; Joseph L. Morales, Esq.

(57) ABSTRACT

The present invention corresponds to a condensation device which in turn comprises said condensation device. The condensation device includes a first container (10), a heat exchanger (20) housed inside the first container, a condensing chamber (30) below the heat exchanger and a stirrer (40) housed inside the first container. In an embodiment of the invention, the condensation device also comprises a second container, where both containers have a double wall. Moreover, the containers may include flanges for the inlet and outlet of substances into the containers and the heat exchanger, and for monitoring the substances inside the device.

16 Claims, 11 Drawing Sheets

(56) References Cited

U.S. PATENT DOCUMENTS

| | | | | |
|---|---|---|---|---|
| 4,408,024 A | * | 10/1983 | Matsuyama | C08F 10/00 422/138 |
| 4,511,376 A | * | 4/1985 | Coury | B01D 5/009 95/263 |
| 4,570,702 A | * | 2/1986 | Stafford | C02F 1/22 165/DIG. 402 |
| 5,053,110 A | * | 10/1991 | Deutsch | C02F 1/14 203/1 |
| 5,772,850 A | * | 6/1998 | Morris | B01D 1/305 159/24.2 |
| 6,620,969 B1 | * | 9/2003 | Nishimura | F28F 9/18 165/158 |
| 6,883,788 B1 | * | 4/2005 | Tagamolila | B01D 3/166 165/DIG. 197 |
| 10,046,250 B2 | * | 8/2018 | Zebuhr | B01D 5/006 |
| 10,350,509 B2 | * | 7/2019 | Sammons | B01D 3/42 |
| 11,060,800 B2 | * | 7/2021 | Maruoka | F28D 20/021 |
| 2002/0176812 A1 | * | 11/2002 | Takai | C08F 218/08 422/138 |
| 2005/0065374 A1 | * | 3/2005 | Pennino | B01D 5/0081 564/66 |
| 2010/0276122 A1 | * | 11/2010 | Daly | F28F 1/10 165/111 |
| 2010/0319397 A1 | * | 12/2010 | Lee | B01D 53/002 62/93 |
| 2012/0018133 A1 | * | 1/2012 | Postma | F28D 3/02 165/104.21 |
| 2012/0085635 A1 | * | 4/2012 | Haynes | C02F 1/06 202/185.1 |
| 2015/0360971 A1 | * | 12/2015 | Schleiffarth | C02F 1/041 |
| 2016/0327341 A1 | * | 11/2016 | Artamo | B01D 5/0012 |
| 2017/0106310 A1 | * | 4/2017 | Astoria | B01D 1/0041 |
| 2017/0307300 A1 | * | 10/2017 | Daly | B01D 5/0009 |
| 2017/0334737 A1 | * | 11/2017 | Govindan | C02F 5/08 |
| 2017/0369352 A1 | * | 12/2017 | Huber | C03B 5/20 |
| 2018/0030181 A1 | * | 2/2018 | Emoto | C07C 2/32 |
| 2023/0149981 A1 | * | 5/2023 | Shiraishi | B08B 3/024 134/172 |

FOREIGN PATENT DOCUMENTS

| | | | | |
|---|---|---|---|---|
| GB | 150785 | * | 9/1920 | |
| GB | 150785 A | | 9/1920 | |
| JP | 2004020095 A | | 1/2004 | |
| JP | 2004244527 A | * | 9/2004 | |
| WO | WO-2016187587 A2 | * | 11/2016 | B01D 1/0094 |
| WO | WO-2017198261 A1 | * | 11/2017 | B01D 1/0082 |

* cited by examiner

CONDENSATION DEVICE COMPRISING A STIRRER IN A CHAMBER FOR COLLECTING THE CONDENSATE

FIELD OF INVENTION

The present invention relates to machines and devices used for the condensation and distillation of substances and the recovery of fuels from plastic residues and from natural oils and fats. Specifically, the present invention relates both to devices performing recovery of drinking water from non-drinking water and to devices performing catalytic pressureless depolymerization of plastic residues and simultaneous transesterification of natural oils and fats.

PRIOR ART DESCRIPTION

Prior art contains documents disclosing devices for heat exchange, evaporation and/or condensation of substances, such as those taught in JP2004020095A and US20170106310A1.

JP2004020095A discloses a device for heat transfer between fluids. This device comprises a tank divided into three chambers, a first upper flow chamber, a second heat transfer chamber and a third lower flow chamber. The upper flow chamber includes a product inlet, a supervision hatch and a stirrer. The heat transfer chamber is delimited by two horizontal partition plates, between which a plurality of cylinders is housed having their entry and exit in the upper and lower flow chambers, respectively. Finally, the lower flow chamber includes an outlet for liquid product.

The heat transfer chamber cylinders are divided into two groups, a first group of cylinders located in the center of the tank and a second group of cylinders arranged next to the inner wall of the tank. Inside all the cylinders are two types of fins having the particularity of directing fluid in opposite directions.

JP2004020095A states that the liquid product enters through the upper flow chamber wherein it is stirred and directed to the lower flow chamber through the first group of cylinders. Fluid circulates between the cylinders of the heat transfer chamber that cools or heats the product. Then the product reaches the lower flow chamber and due to the shape of the fins inside the cylinders, the product rises again to the upper flow chamber through the second group of cylinders and with the help of their internal fins. The previous cycle is repeated as many times as deemed necessary and then the product is evacuated through the product outlet in the lower chamber.

On the other hand, US20170106310A1 discloses an evaporator. The evaporator includes a cylinder in which a stirrer is housed. The cylinder has an inlet duct and an outlet duct which are located at the top and bottom of the cylinder, respectively. Moreover, the evaporator includes at least one steam outlet that is located at the top or bottom of the cylinder, depending on whether the operation is in direction of, or against, the steam flow.

Moreover, US20170106310A1 discloses the use of a heating jacket and a product supply pipe, which can be setup in multiple ways. In a possible configuration, the heating jacket is a double-walled duct that surrounds the cylinder along its entire length and the product supply pipe has the same shape and surrounds the heating jacket. In another embodiment, the product supply pipe is described as a duct that helically surrounds the outer surface of the jacket along its entire length. Another configuration suggests that the heating jacket and supply pipe functions are performed by adjacent or coaxial ducts to each other, which surround the cylinder along its entire length. In all configurations it is possible to include thermal insulation to ensure heat transfer efficiency.

The evaporator disclosed by US20170106310A1 is preferably a thin film evaporator; such film is generated by the rotating blades of the stirrer distributing the liquid product supplied uniformly on the internal face of the cylinder. The film has a thickness between 0.3 mm and 5 mm facilitating the evaporation at low temperatures. Finally, US20170106310A1 also describes an embodiment wherein there is a short-path evaporator; this combines the function of a film evaporator and a condenser within the same device. In this embodiment the condenser is housed in the center of the cylinder and is surrounded by the stirrer.

Accordingly, JP2004020095A and US20170106310A1 disclose devices for heat exchange and for substance evaporation. These devices include containers housing elements such as stirrers, ducts and fins, using heating or cooling media and using jackets for such purposes. However, none of them perform a condensation process with the aid of a condensing chamber and stirrer arranged in the outlet region of the heat exchanger. The use of such devices as part of a distillation system is not indicated. Moreover, the adaptation of heat exchange devices to small areas such as different housing options like apartments or houses, office space, building warehouses, shopping malls, among others, is usually complicated due to their size.

BRIEF DESCRIPTION OF THE INVENTION

The present invention corresponds to a condensation device and a distillation device which in turn comprises said condensation device. The condensation device includes a first container, a heat exchanger housed inside the first container, a condensing chamber below the heat exchanger and a stirrer housed inside the first container. In an embodiment of the invention, the condensation device also comprises a second container, where both containers have a double wall. Moreover, the containers may include flanges for the inlet and outlet of substances into the containers and the heat exchanger, and for monitoring the substances inside the device.

On the other hand, the present invention claims a distilling device which includes the condensation device mentioned above and a reactor connected to the latter by means of a duct. The condensation device comprises a first container, a tube and shell heat exchanger housed inside the first container, a condensing chamber beneath the tube and shell heat exchanger, and a second container beneath the condensing chamber. Further, the reactor has a first container connected by means of a duct to the first container of the condensation device and a second coaxial container to the first container.

DETAILED DESCRIPTION OF THE INVENTION

The present invention corresponds to a condensation device and a distillation device comprising said condensation device.

Figure 2:
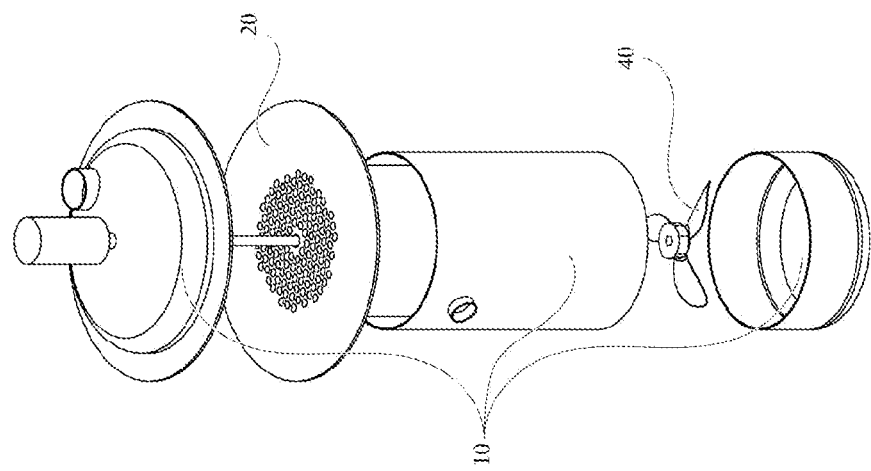
FIG. 2 corresponds to an exploding view of the FIG. 1 device.
Figure 1:
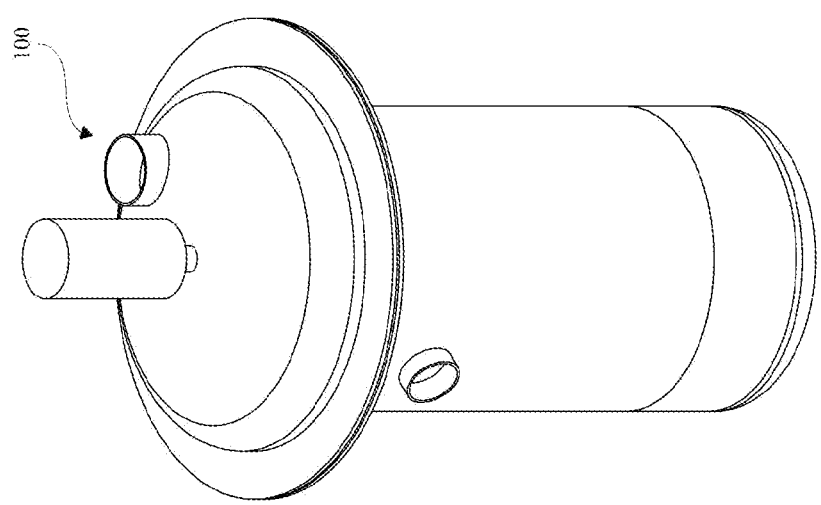
FIG. 1 corresponds to an isometric view of an embodiment of the invention device.

The condensation device comprises a first container, a heat exchanger housed inside the first container, a condensing chamber below the heat exchanger and a stirrer housed inside the first container. The main components of the condensation device of this invention are detailed below:

Referring to FIG. 1 and FIG. 2, the first container (10) is a container into which the heat exchanger (20), the condensing chamber (30) and the stirrer (40) are installed, and where a solid-liquid-gas or liquid-gas mixture is housed throughout the condensation process, which undergoes a chemical reaction or phase change.

For the purpose of understanding this invention, "container" and "receptacle" shall be understood to mean an enclosure with one or more openings, such as a duct with two openings facing each other or a cavity with a single opening.

Optionally, the first container (10) is a cylinder constructed from one or more sheets and has only one wall.

Figure 3:
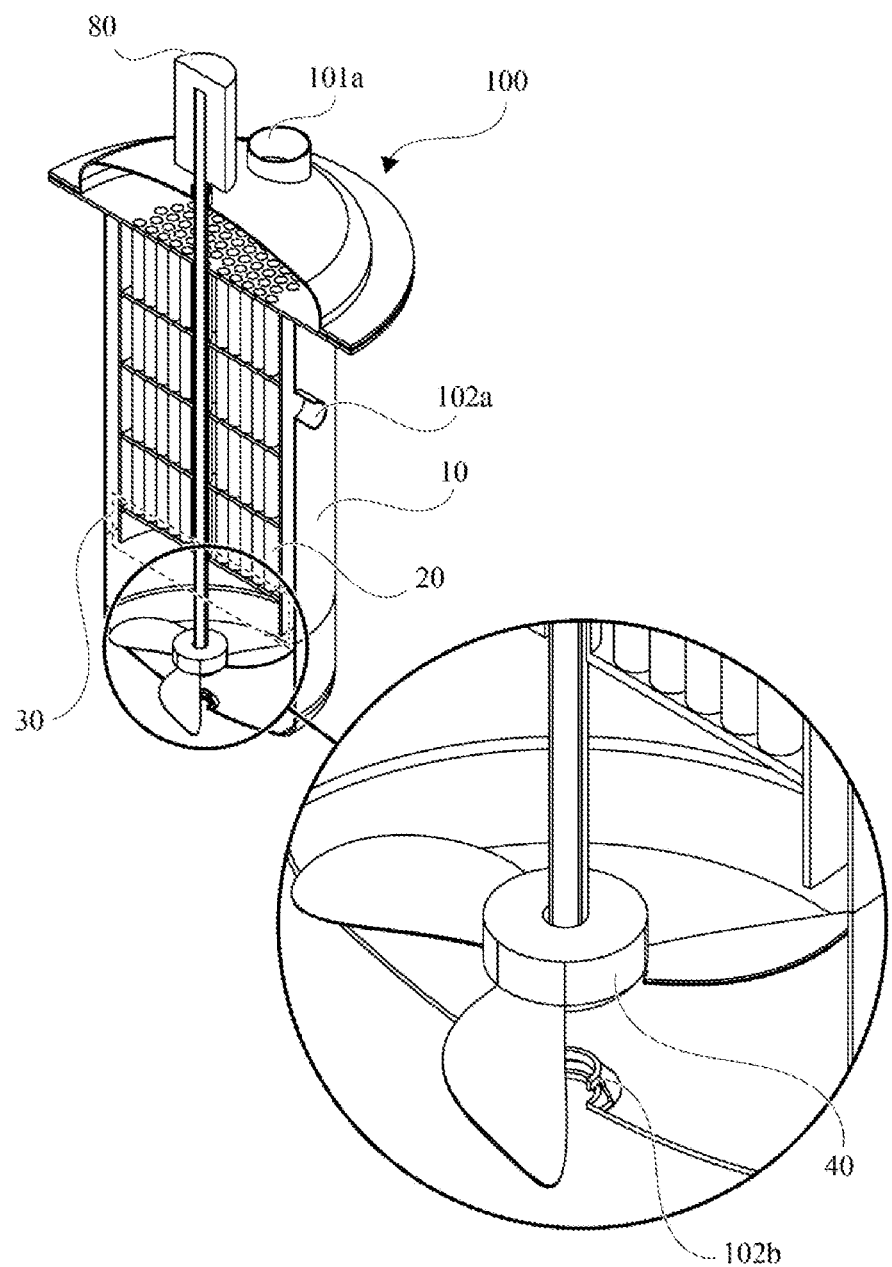
FIG. 3 corresponds to a cutaway view of the FIG. 1 device.

Referring to FIG. 3, in a embodiment of the invention the first container (10) has a first inlet (101*a*) and an outlet opening (102*a*), wherein the first inlet (101*a*) is the inlet for a fluid in a gaseous or liquid-gaseous state and the outlet opening (102*a*) is located on the wall of the first container (10) allowing the outlet of the condensed fluid. In the present design, the first container (10) has a single wall that surrounds and houses all the other components of the condensation device (100), i.e., the heat exchanger (20), the condensing chamber (30) and the stirrer (40).

Again referring to FIG. 3, in an embodiment of invention, the condensation device (100) has an outlet (102*b*) which is located at the bottom of the first container (10). This exit is optional and allows access to the bottom of the condensation device (100) to empty its contents or enter fluids into it.

Figure 4:
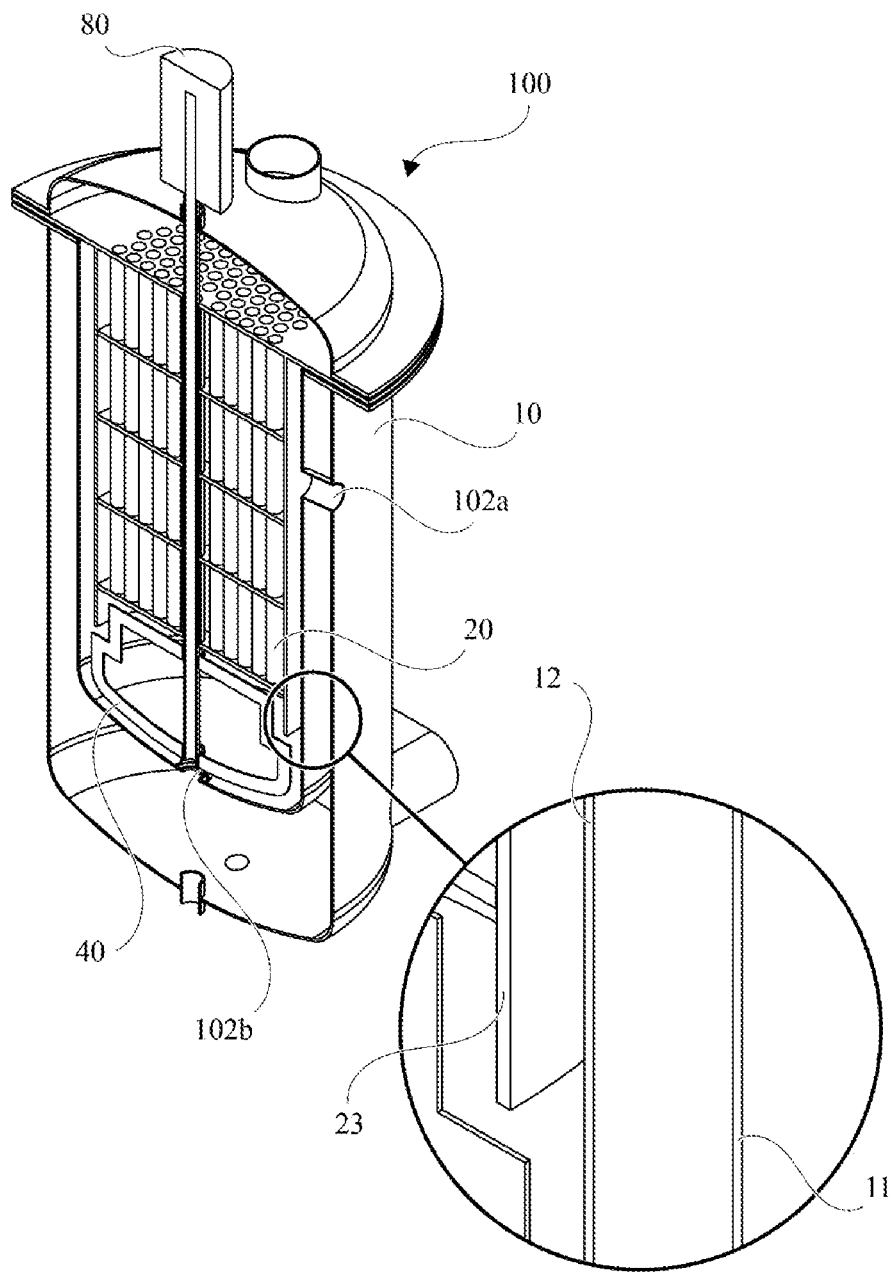
FIG. 4 corresponds to a cutaway view of a second embodiment of this invention device.

On the other hand, and referring to FIG. 4, optionally the first container (10) consists of an external wall (11) and an internal wall (12) divided by an empty space. In this construction, the internal wall (12) forms an enclosure that houses the heat exchanger (20), the condensing chamber (30) and the stirrer (40). The empty space formed between both walls (11 and 12) of the first container (10) has multiple functions: this empty space houses a heat source or any type of refrigerant or heating fluid depending on the operation of the device. The heat source is selected, for example, from the group consisting of gas heaters, electric resistance heaters, steam jacket heaters, coal heaters, heaters using fuel elements, forced draft burners, wood or biomass heaters, radiant burners, thermal oil boilers or combinations of the foregoing, but not limited to them.

For its part, the fluid housed within the walls of the first container (10) is selected, for example, between water, water steam, methane gas, liquefied petroleum gas, compressed natural gas, air, thermal oils, ammonia, glycol, ethylene glycol, refrigerant gases or liquids, and combinations thereof. In an embodiment of the invention, the walls of the first container (10) contain a solid fuel such as wood, coal, biomass, or organic waste from animal or vegetable source.

The space between the walls (11 and 12) also serves as insulation that decreases heat transfer between the surfaces of both walls (11 and 12) or in a particular construction includes an insulating material that also serves as thermal insulation. This insulating material is selected from the group made up of mineral wool (rock wool), expanded polystyrene, extruded polystyrene, polyurethane foam, phenolic resin foam, glass foam (glass wool), wood wool slabs, perlite plates, cork, aerogel, cotton, arlite vermiculite, wheat husks, spelt, flax, cereal pellets, hemp, wood shavings, cellulose, wood fiber, wood wool, reeds, wood fibers, cotton, arlite, cork, seaweed, straw, grass, rock wool, blanket, rigid panels, shells, glass wool, natural sheep wool, expanded glass, expanded polystyrene (eps), cellulose foam, polyethylene honeycomb film, polyurethane foam, and a combination thereof.

Figure 5:
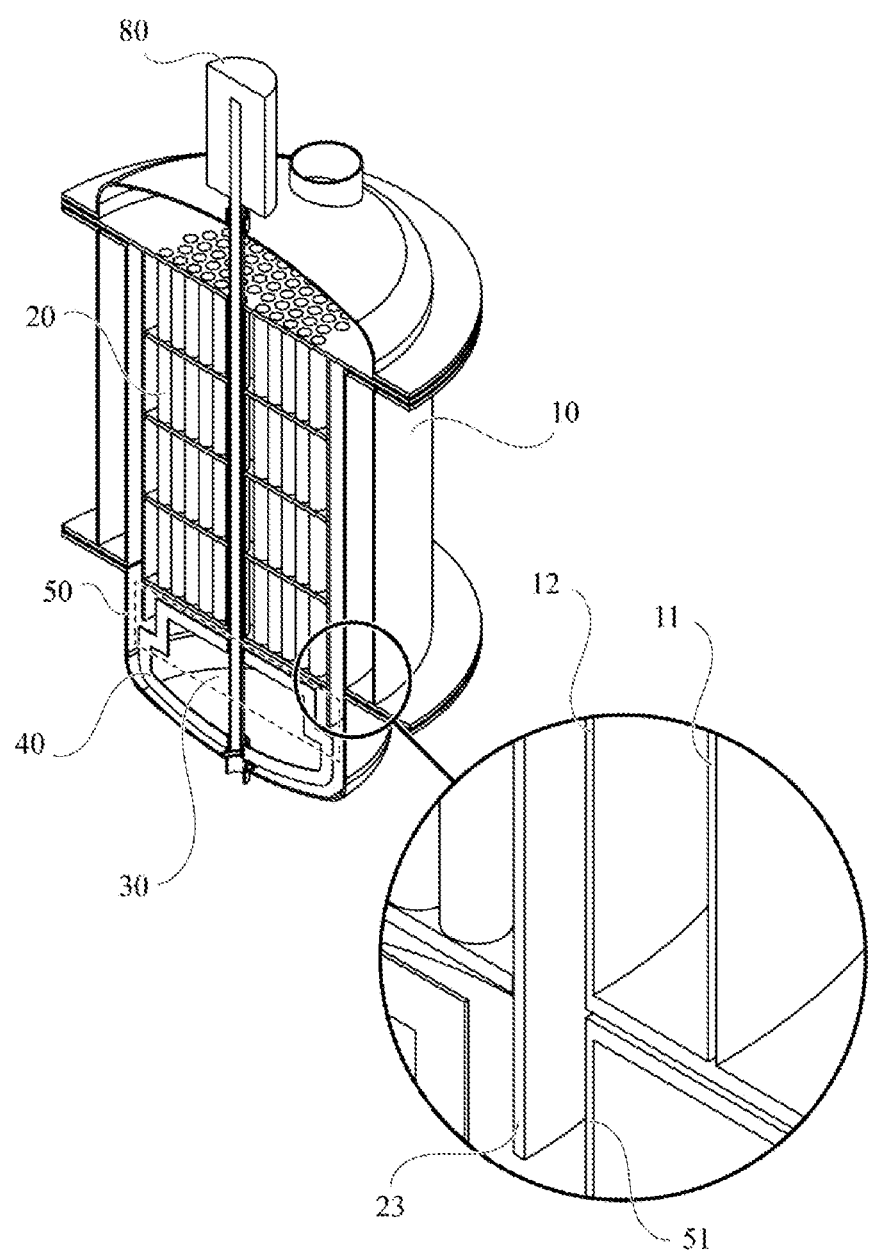
FIG. 5 corresponds to a cutaway view of a third embodiment of this invention device.

Referring to FIG. 5, the condensation device (100) includes a second container (50) which houses and surrounds the condensing chamber (30). Preferably, both the first container (10) and the second container (50) are cylindrical. This second container (50) is coaxial to the first container (10) and is coupled to it at one end to configure an enclosure. This coupling is carried out by means such as flanges, welding, joining by fixing elements, monolithic manufacture by means of moulds, joining by means of adhesives, welding or a combination thereof.

Referring to FIG. 5, the first container (10) has both the internal wall (12) and the external wall (11) described above. The second container (50) consists of a single wall. However, in a non-illustrated version it is possible that the second container (50) has a double wall, while the first container (10) has a single wall.

It should be noted that in any embodiment of this invention where there is a first container (10) and a second container (50), these are communicated inside, as illustrated in FIG. 5 to FIG. 7 and FIG. 10, and that in no case are they two adjacent containers completely separated by a dividing wall.

Figure 6:
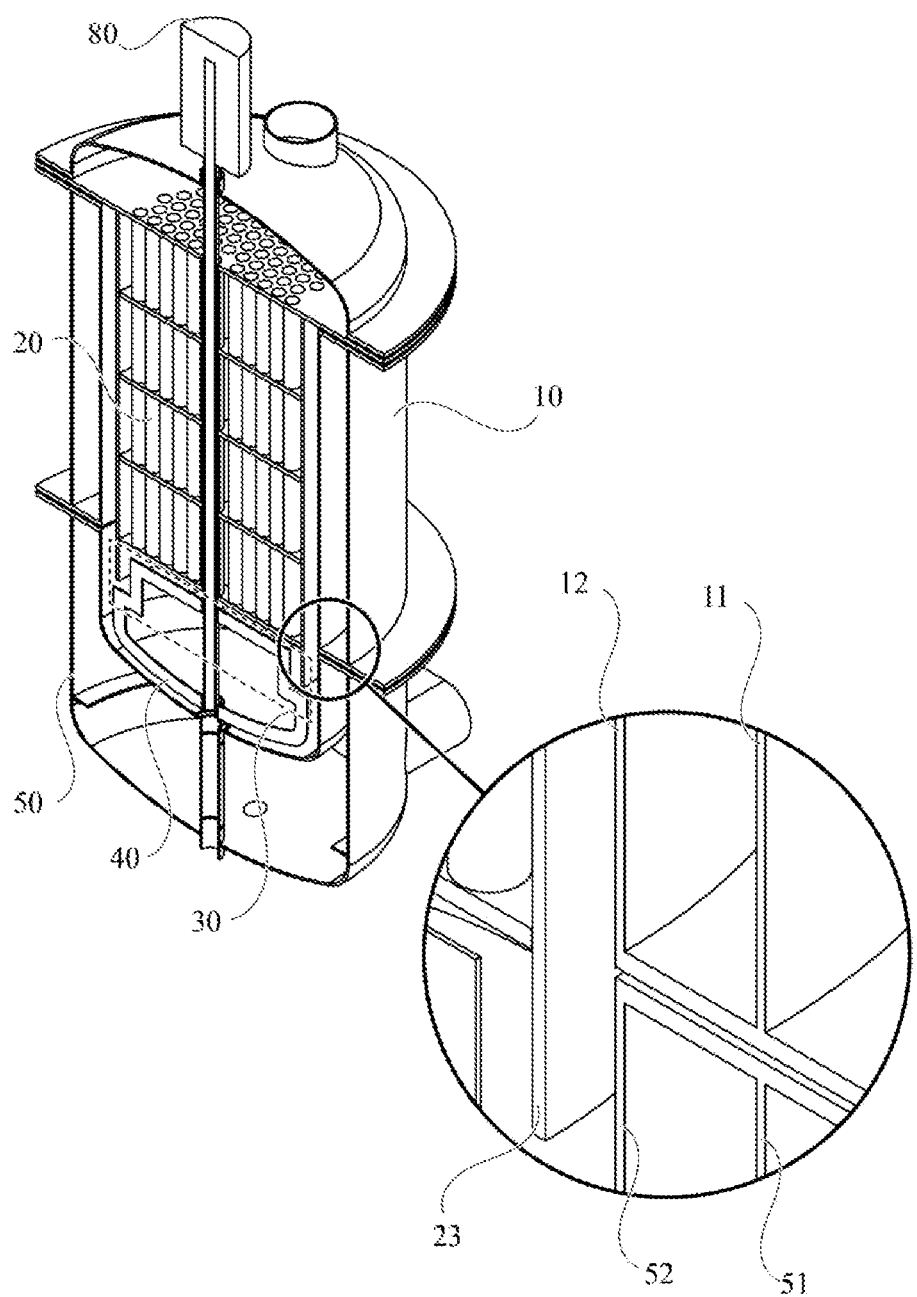
FIG. 6 corresponds to a cutaway view of a fourth embodiment of this invention device.

One of the technical effects of having two independent containers (10 and 50) is that it is possible to carry out different heat transfer processes in each section of the condensation device (100). Referring to FIG. 6, an example of the above is when the condensation device (100) has a first container (10) with two walls into which a first fluid enters, while in a second container (50) with two liners (an inner jacket (52) and an outer jacket (51)), a second fluid enters at a higher temperature than the first fluid. In this example, the walls around the heat exchanger (20) are at a temperature different from the temperature transferred by the inner jacket (52) from the second container (50) to the condensing chamber (30). It is then possible to independently control the temperature of each of the containers (10 and 50).

The shape of each of the two containers (10 and 50) is selected from the group formed by pyramids, cones, cubes, prisms, spheres, orthohedrons, parallelepipeds, cylinders, hyperboloids, equivalent forms known by a normally skilled person and combinations thereof.

Referring to FIG. 6, preferably both the second container (50) described above and the first container (10) consist of two coaxial walls where a first wall surrounds a second wall. From now on and for the understanding of the present embodiment, the walls of the first container (10) will be called external wall (11) and internal wall (12), while the walls of the second container (50) will be called outer jacket (51) and inner jacket (52).

Considering the aforesaid, in the preferred embodiment of the invention illustrated in FIG. 6, the second container (50) has a cavity between the outer jacket (51) and the inner jacket (52) that allows a heat source or refrigerant substance to be housed. This cavity is crossed by an internal duct that connects the region of the condensing chamber (30) with the outlet opening (102b). This duct prevents the condensed fluid from falling into the cavity between the outer jacket (51) and the inner jacket (52) of the second container (50), and coming into contact with the heat source housed there. On the other hand, the heat source is selected, for example, from the group made up of gas heaters, electric resistance heaters, steam jacket heaters, coal heaters, heaters using fuel elements, forced draft burners, wood or biomass heaters, radiant burners, thermal oil boilers and combinations of the foregoing, without being limited to these heat sources.

On the other hand, both the first container (10) and the second container (50) are open or not to the atmosphere and operate or not under vacuum conditions. Additionally, in an example of the invention the containers (10 and 50) operate at a temperature between 0° C. and 6° C., between 5° C. and 90° C., between 8° C. and 95° C., between 10° C. and 100° C., between 15° C. and 105° C., between 20° C. and 110° C., between 25° C. and 120° C., between 30° C. and 125° C., between 70° C. and 250° C., between 110° C. and 400° C., between 800° C. and 1100° C. or between 1100° C. and 1800° C. In another example of the invention, containers (10 and 50) operate at a temperature between 0° C. and −6° C., between −5° C. and −10° C., between −10° C. and −50° C., between −50° C. and −100° C., between −100° C. and −150° C., between −150° C. and −200° C. or between −200° C. and −273° C.

Containers (10 and 50), for example, have a capacity ranging from 0.0001 $m^3$ to 0.1 $m^3$, 0.1 $m^3$ and 1 $m^3$, 1 $m^3$ and 10 $m^3$, between 10 $m^3$ and 20 $m^3$, between 20 $m^3$ and 30 $m^3$, between 30 $m^3$ and 40 $m^3$, between 40 $m^3$ and 50 $m^3$, between 50 $m^3$ and 60 $m^3$, between 60 $m^3$ and 70 $m^3$, between 70 $m^3$ and 80 $m^3$, and between 80 $m^3$ and 100 $m^3$, between 100 $m^3$ and 200 $m^3$, between 200 $m^3$ and 500 $m^3$, between 500 $m^3$ and 1000 $m^3$, between 1000 $m^3$ and 1500 $m^3$ or 1500 $m^3$ and 1000000 $m^3$.

For the understanding of the present invention, it will be understood that the temperature, pressure and volumetric capacity conditions of both containers (10 and 50) are operating variables that are selected according to the substances processed in the condensation device (100). These operating variables are defined and calculated by a normally skilled person in the field.

Moreover, in a particular invention example, the material of the containers (10 and 50) is selected from stainless steel, such as 304 stainless steel and 316 stainless steel, carbon steel, aluminum, copper, bronze, brass, austenitic nickel-chromium-based alloys, polyacrylates, plastic resins (e.g., 304 stainless steel and 316 stainless steel).gr. polyester, vinyl ester, epoxy) reinforced with fibers (e.g. glass, aramid, carbon, polyester), polypropylene, polyethylene, polyamides, concrete, reinforced concrete and combinations of the above. In other inventions the material of the containers (10 and 50) is selected between transparent metalcrylate, iron, polycarbonate, carbon nanotubes, carbon fiber, glass fiber, graphite, glass, borosilicate glass, antimony, titanium, magnesium, palladium or radio.

Also, containers (10 and 50) may have an external and internal coating, such as electrostatic, epoxy, or vinyl paint, which prevents corrosion of the condensation device (100) if exposed to weather or adverse weather conditions. This coating also prevents corrosion of the condensation device (100) when the contents of the containers (10 and 50) chemically attack the internal surface of the containers. Additionally, the containers (10 and 50) may have a coating of ceramic materials deposited chemically or physically by steam; galvanized, anodized, tropicalized, cemented, nitrided, sintering of ceramic coatings and combinations thereof.

Containers (10 and 50) can be manufactured from metal plates joined together by welding (e.g. SMAW, GMAW, GTAW, FCAW, OAW), and other welding methods accepted by the American Welding Society. These containers (10 and 50) can also be manufactured by extrusion, turning, casting, CNC machining and other manufacturing processes known to a normally skilled person in the art.

Figure 7:
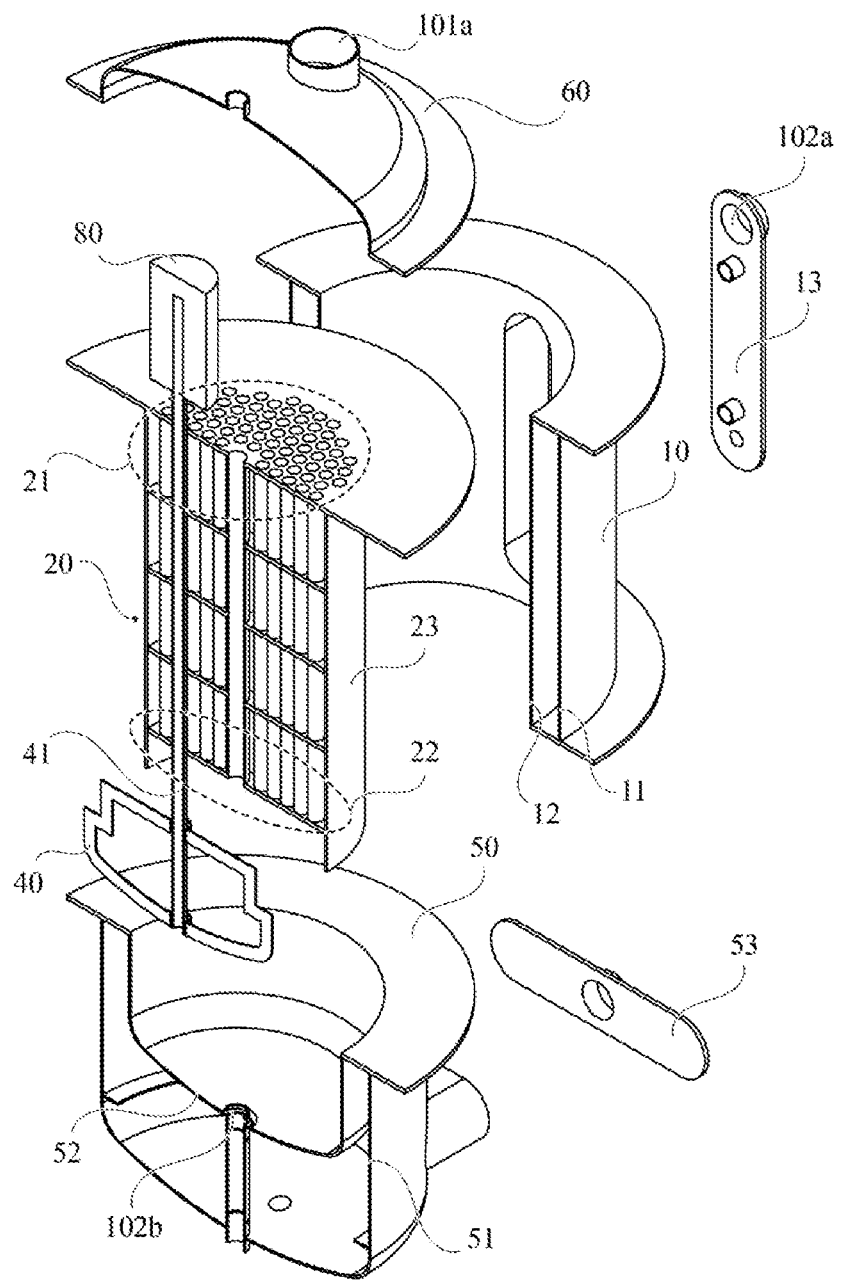
FIG. 7 corresponds to an exploding view of the FIG. 6 device.

Referring to FIG. 7, the condensation device (100) includes a lid (60) which is coupled to the heat exchanger (20) and the first container (10) forming a chamber between the heat exchanger (20) and the lid (60), where the gaseous fluid accumulates before entering the heat exchanger (20). This lid (60) presents a first inlet (101a) and a second inlet (101b) (not visible in said FIG. 7). Moreover, the first container (10) is double-walled and surrounds the heat exchanger (20). Moreover, it has a borehole with a flange of the first container (13), which will be described in detail below.

This condensation device (100) of the FIG. 7 also includes a second container (50) with an outer jacket (51) and an inner jacket (52), where the inner jacket (52) surrounds the condensing chamber (30) and the stirrer (40). A heat source is housed in the cavity formed between the outer jacket (51) and the inner jacket (52) of the second container (50). For the purpose of monitoring, locating or feeding this heat source, a second container flange (53) is provided in an opening of the outer jacket (51), this flange will be described in detail below. The stirrer (40) enters the condensing chamber (30) and protrudes from it.

Referring to FIG. 7, the outlet opening (102a) of the condensation device (100) is located between the first container (10) and the flange (13) and allows condensate to escape.

The device of the present invention has multiple embodiments (see FIG. 3, FIG. 4, FIG. 5. and FIG. 6) where both the first container (10) and the second container (50) have one or two walls, this allows different configurations for the cooling or heating of the fluid in its path through the condensation device (100).

The components housed inside the first container (10) and the second container (50) are described below, according to the embodiments explained above:

The heat exchanger (20) housed inside the first container (10) allows condensing of the gases entering the condensation device (100). This heat exchanger (20) is selected from the group consisting of direct contact heat exchangers, indirect contact heat exchangers, alternative heat exchangers, surface heat exchangers, plate heat exchangers, tube heat exchangers, concentric tube heat exchangers, tube and shell heat exchangers, cross-flow heat exchangers, parallel flow heat exchangers, co-current heat exchangers and counter-current heat exchangers.

Referring to FIG. 7, the heat exchanger (20) has an inlet region (21) at the first longitudinal end, and an outlet region (22) at the opposite end. The inlet region (21) is adjacent to the lid (60), and comprises the volume limited by the lid (60) and the area through which gases enter the heat exchanger (20). The oulet region (22) is the volume between the area through which the condensed substance leaves the heat exchanger (20), and the surface of the bottom of the first container (10) (in the case where only one container is used (10)) or of the second container (50) (in the case where both containers are used (10, 50)). Both the input region (21) and the outlet region (22) are inside the condensation device (100) of this invention.

Referring to FIG. 5 to FIG. 7, the heat exchanger (20) comprises tubes and shell. This type of heat exchanger allows heat exchange between two fluids and its construction is possible in a wide variety of sizes and configurations. This type of equipment consists of a cylindrical shell containing a single tube or arrangement of tubes parallel to the longitudinal axis of the shell. The tubes optionally have fins (not illustrated), and are held at each end by perforated sheets (also known as mirrors). Moreover, the tubes pass through a series of so-called baffle plates (also known as baffles) that are distributed along the entire shell. These deflectors direct the flow of a first fluid that circulates through the shell in such a way that the direction of the fluid is always perpendicular to the tubes. The second fluid goes inside the tubes and along its route through these exchanges heat with the first fluid that runs through the shell. An advantage of using this type of heat exchanger (20) inside the first container (10) of the invention is that the heat exchange with the second fluid is not only on the inner surface of the tubes, but also on the outer surface of the shell, increasing the heat exchange area and thus the capacity of the device to condense the second fluid.

Moreover, the shell and tube heat exchanger allows heat transfer between the first and second fluids without mixing them. On the other hand, another advantage of housing a tube and shell exchanger inside the first container (10) is that, under the outlet region (22) a portion of liquid fluid is deposited that allows condensing by direct contact of the fluid in a gaseous state that emerges from said outlet region (22) and is mixed with said liquid fluid.

Moreover, there are two basic types of shell-and-tube heat exchangers: the fixed type or stationary type, which has the two ends of the tubes fixed to the shell and the one that has only one end of the tubes attached to the shell. In the first case, an expansion joint is required due to the differential expansion suffered by the materials that make up the equipment. In the second case the problems caused by differential expansion can be eliminated by using a floating tube head that moves freely within the shell.

On the other hand, referring to FIG. 3 and FIG. 5, the condensing chamber (30) is located in the outlet region (22) of the heat exchanger (20).

This condensing chamber (30) is a region delimited by a wall extending from the outlet region (22) of the heat exchanger (20) and in turn surrounds this outlet region (22). The wall of the condensing chamber (30) directs the fluid that still has a gaseous portion to the moving blades of the stirrer (40). The encounter with these blades allows the bubbles, i.e. the gaseous fraction of the fluid, to break and condense their contents by the action of movement, temperature and contact with this stirrer (40). This complements the action of the heat exchanger (20) and increases the percentage of condensed fluid, while homogenizing the temperature of the fluid in liquid state.

In an example of the invention, the shape of the volume defined by the condensing chamber (30) is selected from the group formed by pyramids, cones, cubes, prisms, spheres, orthohedrons, parallelepipeds, cylinders, hyperboloid, equivalent forms known by a normally skilled person and combinations thereof.

On the other hand, it is important to mention that the condensation device (100) allows chemical reactions, such as transesterification, to be carried out inside it. According to this and referring to FIG. 4, in some invention embodiments the lower part of the first container (10) corresponds to a cavity between the external wall (11) and internal wall (12) where a heat source is housed allowing the heating of a fluid that is housed under the heat exchanger (20). Similarly, in FIG. 6 it is observed that in the embodiment where there are two containers (10 and 50) the cavity where the heat source is housed is located in the lower part of the second container (50) between the outer jacket (51) and the inner jacket (52), thus allowing the heating of a fluid that is under the heat exchanger (20). Furthermore, in embodiments of the invention, such as those observed in FIG. 3 and FIG. 5, the lower part of the first container (10) or the second container (50) are not surrounded by walls or other cavities and can be placed directly on a heat source to carry out a chemical reaction as mentioned above.

Referring to FIG. 2 to FIG. 7, the stirrer (40) of the present invention is arranged below the
condensing chamber (30). This stirrer (40) has at least one blade or preferably four blades and its rotational movement allows, as mentioned above, not only the mixing of the fluid in liquid state, but also the condensing of fractions in gaseous state.

Referring to FIG. 7, the stirrer (40) is connected to a shaft (41) that runs longitudinally through the heat exchanger (20), where the stirrer blades (40) are connected to one of the longitudinal ends of that shaft (41). This stirrer (40) is located in the condensing chamber (30) and rotates due to the movement that a power transmission mechanism (80) transmits to the shaft (41). This power transmission mechanism (80) can be located outside the condensation device (100) as shown in FIG. 7.

This power transmission mechanism is preferably connected to a motor, and in turn, this motor is optionally connected to a speed reducer which allows the stirrer speed (40) to be adjusted to an adequate power according to the fluid located inside the condensing chamber (30).

The power transmission mechanism is selected from the group made up of: transmission chains, transmission belts, pulleys, toothed pulleys, gears, worm and pinion mechanism, pinion mechanisms, rack mechanism, friction wheels or discs, ribbed shafts, cardan joints and homokinetic joints, camshafts, equivalent elements that are known to a normally skilled person in the art, and combinations thereof.

For its part, the motor is selected from the group made up of alternating current motors (e.g. three-phase synchronous motors, synchronized asynchronous motors, motors with a permanent magnet rotor, single-phase motors, two-phase motors, motors with auxiliary start winding and with capacitor), direct current motors (e.g. series excitation motors, parallel excitation motors, compound excitation motors), motors with auxiliary start winding, equivalent motors that are known to a normally skilled person and combinations thereof), motors with auxiliary start winding, equivalent motors that are known to a normally skilled person, and combinations thereof.

Moreover, the speed reducer is selected from the group made up of: worm and wheel speed reducers, gear speed reducers, cycloidal reducers, planetary speed reducers, internal gear reducers, external gear reducers, equivalent reducers that are known by a normally skilled person, and combinations thereof.

On the other hand, the first container (10) and the second container (50) of the device of the present invention include at least two flanges, one flange of the first container (13) and one flange of the second container (53) arranged respectively on the surfaces of these containers (10, 50). These flanges allow access to the inside of the first container (10) and to the second container (50) according to each embodiment of the invention. In an embodiment of the invention, the flanges are plates arranged on perforations in the surfaces of the containers (10 and 50). These platens have holes and ducts connected to these holes that enter different areas of the condensation device (100) as will be explained in detail below.

Figure 8:
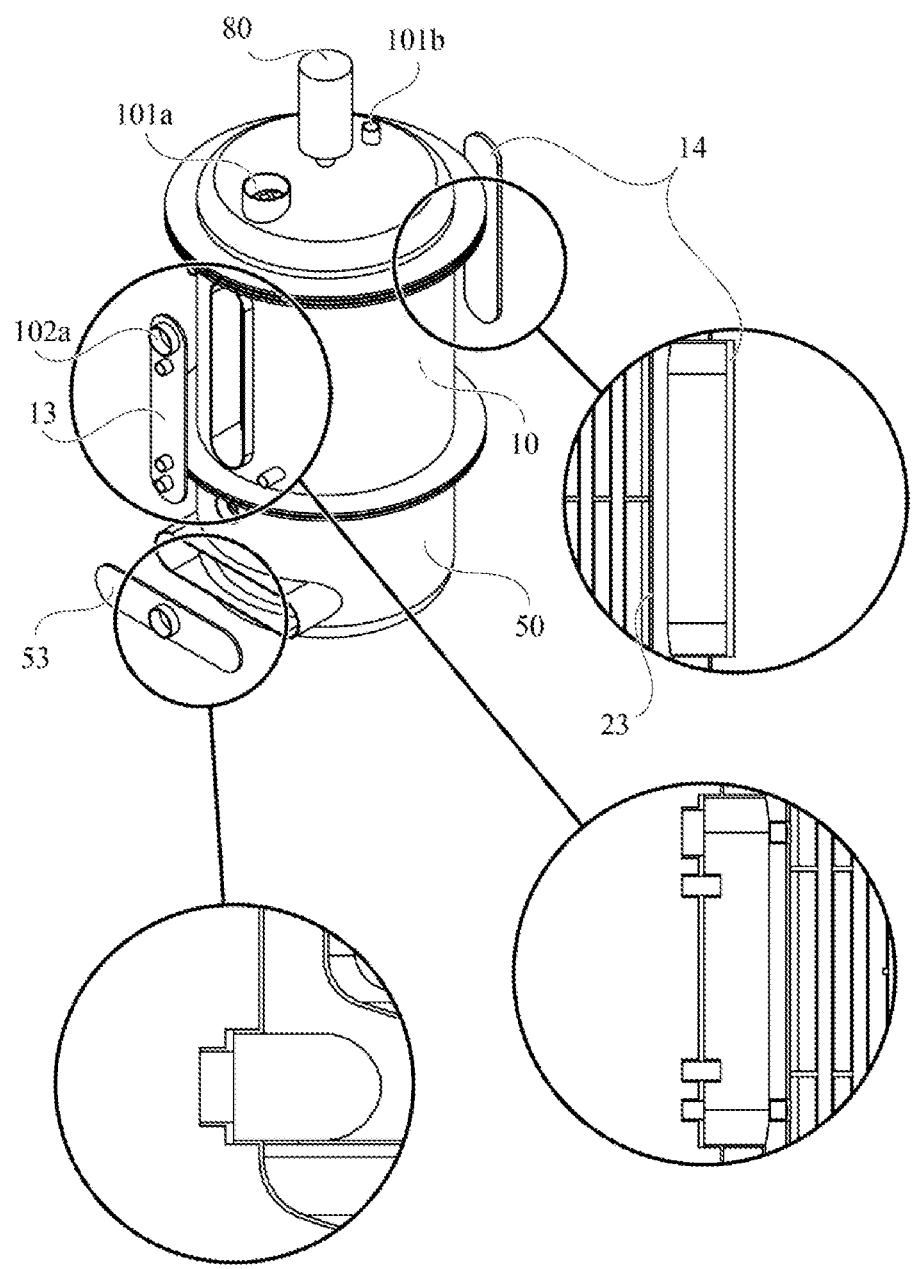
FIG. 8 corresponds to a detailed view of the condensation device in the present invention.

Referring to FIG. 8, a first flange (13) of first container (10) allows access from the outside of the first container (10) to the inside of the heat exchanger (20). This first flange (13) also gives access to the space between the shell of the heat exchanger (20) and the first container (10), and to the space between the walls of the first container (10) if the container is double-walled. For its part, the second flange of the first container (14) is optional and consists of a transparent plate that allows the condensate fluid to be observed rising up the external walls of the heat exchanger (20) as the fluid increases.

Meanwhile, and again referring to FIG. 8, the second container (50) also has a second container flange (53) which is arranged in an opening of the second container (50). If the second container (50) is made up of a single wall, this flange allows access to the condensing chamber region (30). While in the case where the second container (50) is double-walled, such a second container flange (50) would allow access to the cavity where the heat source is housed.

The present invention also comprises a distillation device (300) which in turn comprises any of the above described embodiments of the condensation device (100) and a reactor (200).

Figure 9:
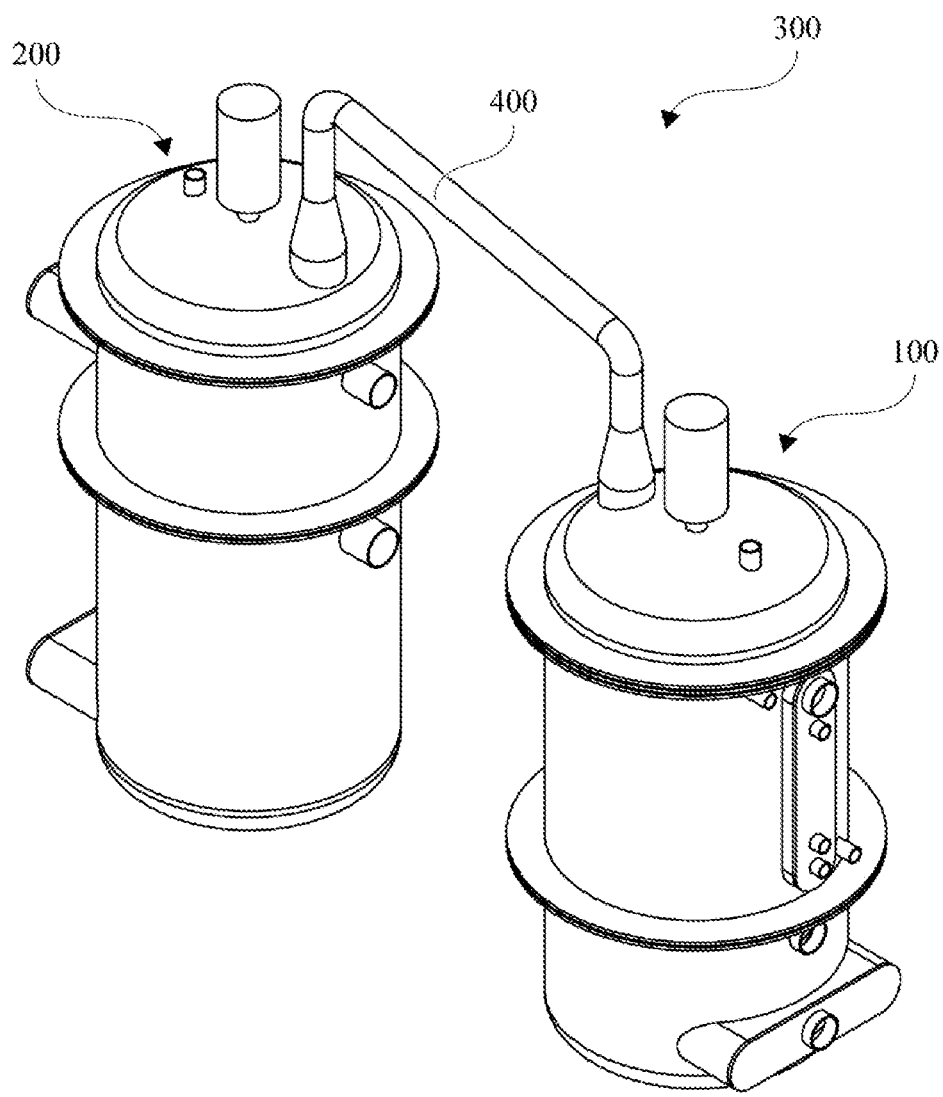
FIG. 9 corresponds to a perspective view of the distillation device in the present invention.
Figure 10:
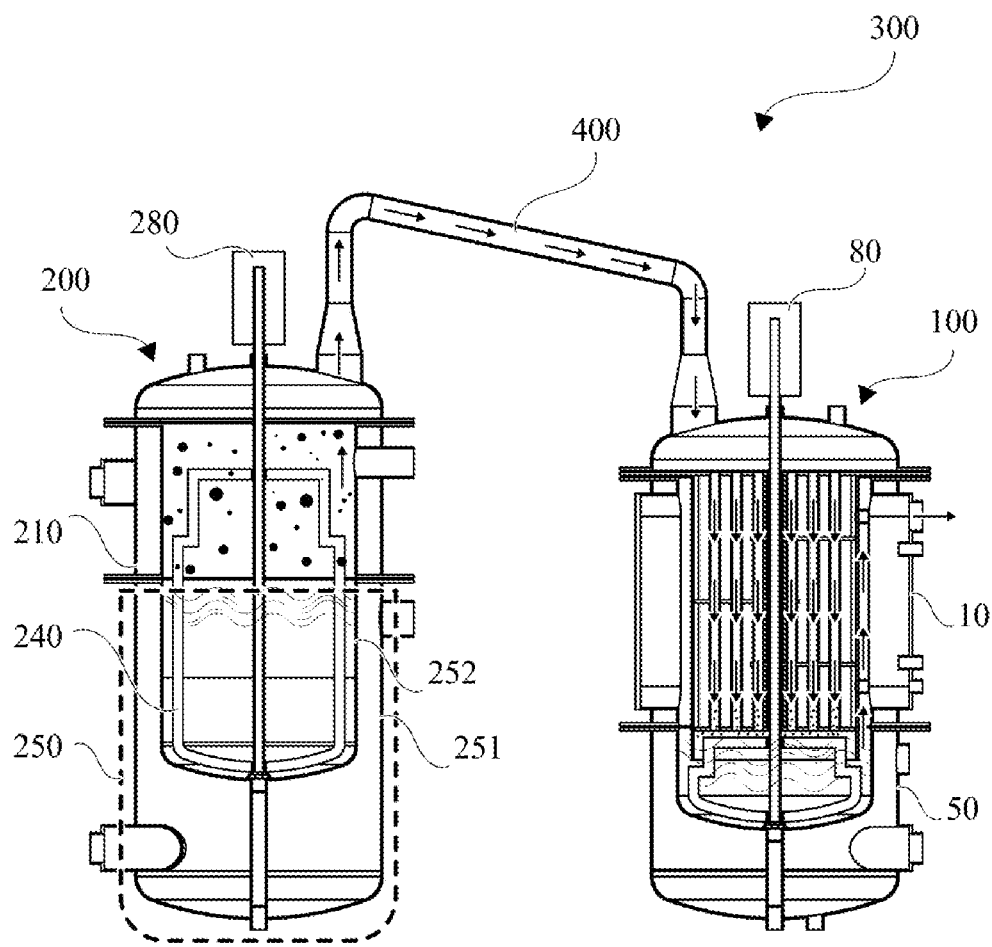
FIG. 10 corresponds to a cutaway view of an embodiment of the distillation device in the present invention, with a scheme of the fluid path within the distiller of the present invention.

Referring to FIG. 9 and FIG. 10, in an embodiment of the invention the distillation device (300) comprises a condensation device (100) which has a double-walled first container (10) and a heat exchanger (20) of tubes and shell housed inside the first container (10). Wherein the heat exchanger (20) of tubes and shell has an inlet region (21) and an outlet region (22). The condensation device (100) also includes a condensing chamber (30) arranged under the outlet region (22) of the heat exchanger (20) and a second double-jacketed container (50). This second container (50) is located below the outlet region (22) of the heat exchanger (20) of tubes and shells, wherein the inner jacket (52) of the second container (50) is located under the condensing chamber (30) and houses a stirrer (40), and the outer jacket (51) of the second container (50) houses this inner jacket (52). The distillation device (300) of the present invention also comprises a reactor (200) connected by means of a duct (400) to the first container (10).

The duct (400) is made of a material that is selected, for example, from the group formed by carbon steel, stainless steel such as 304 stainless steel and 316 stainless steel, galvanized iron, cast iron, polyvinyl chloride (PVC), chromed bronze, copper, chlorinated polyvinyl chloride (CPVC), reticulated polyethylene (PEX), equivalent materials known to a normally skilled person and combinations thereof. The duct (400) is of a material that is selected, for example, from the group formed by squares, triangles, circles, rectangles, pentagons, trapeziums, ellipses, diamonds, hexagon, heptagon, octagon, decagon, equivalent forms known by a normally skilled person, and combinations thereof.

In an embodiment of the invention, the duct (400) have an internal and/or external coating, such as electrostatic, epoxy, or vinyl paint.

Meanwhile, the reactor (200) has a configuration similar to the condensation device (100) with the difference that it does not house a heat exchanger. The reactor (200) consists of one or two coaxial and coupled containers, which, in an embodiment of invention, have flanges for monitoring the conditions inside the reactor (200) (such as temperature, humidity, etc.) and for entry and exit of substances.

The shape of the containers that form the reactor (200) are selected for example from the group formed by pyramids, cones, discs, prisms, cubes, prisms, spheres, orthohedrons, parallelepipeds, cylinders, hyperbole, hyperboloid, equivalents known by a normally skilled person, and combinations thereof.

Referring to FIG. 10, the reactor (200) comprises a first double-walled cylindrical receptacle (210) connected by means of a duct (400) to the first container (10) of the condensation device (100) and a second receptacle (250). This second receptacle (250) has a cylindrical shape, is made up of an inner sheet (252) and an outer sheet (251), and is coaxial to the first receptacle (210) configuring an enclosure with this one. The inner sheet (252) houses a mixer (240) and the outer sheet (251) houses the inner sheet (252).

In an unillustrated embodiment of the invention, the first receptacle (210) and the second receptacle (250) or at least one of them (210, 250) are single-walled. On the other hand, the reactor (200) mixer (240) is optional, and is not necessary for the operation of the reactor (200).

Figure 11:
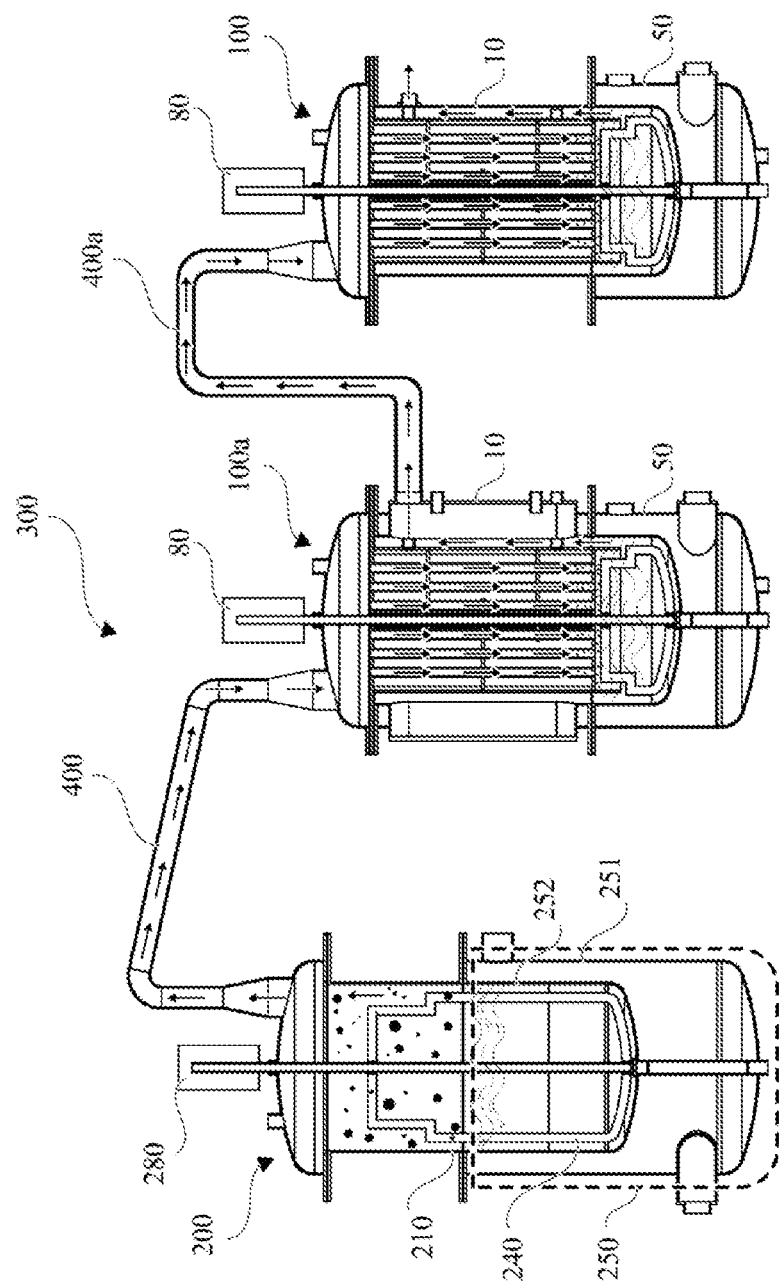
FIG. 11 corresponds to a cutaway view of a second embodiment of the distillation device in the present invention, with a scheme of the fluid path within the distiller of the present invention.
Figure 12:
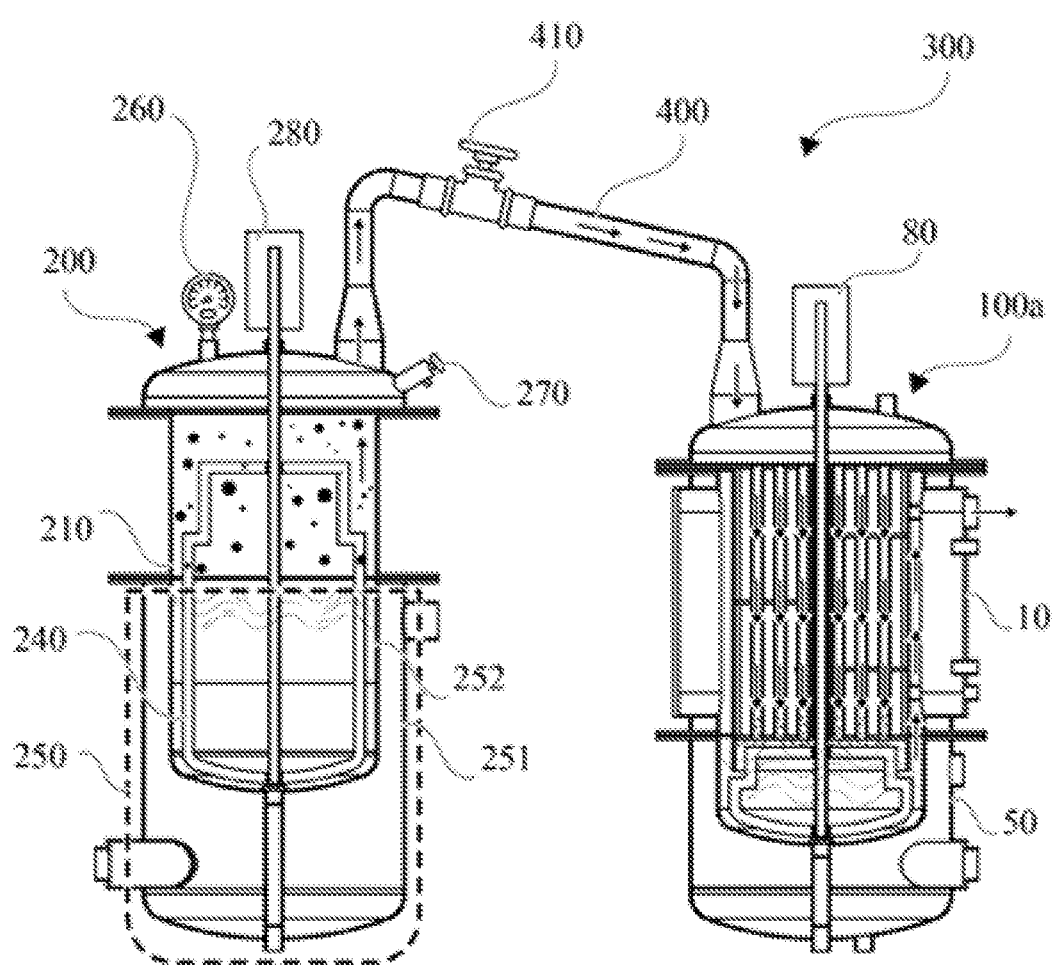
FIG. 12 corresponds to a cutaway view of an embodiment of the distillation device in the present invention, wherein a pressure gauge, a safety valve and a flow valve are included.

Moreover and referring to FIG. 10, FIG. 11 and FIG. 12, in some invention embodiments the reactor (200) includes a power transmission mechanism (280), which is, for example, a motor. This power transmission mechanism (280) allows the mixer (240) to rotate. Moreover, the power transmission mechanism (280) can be located inside or outside the reactor (200).

In an embodiment of the invention the condensation device (100) houses the following fluids:
Process fluid in gas phase: corresponds to the gaseous fluid that enters the condenser through the first inlet (101a).
Condensed process fluid: corresponds to the liquid obtained by condensing the Process fluid in gas phase inside the condensation device (100).

Doping liquid: Liquid that is introduced into the condensation device (100) to contribute to the condensing of gases by coming into direct contact with them.

Process fluid in liquid phase: it is the liquid that arises between the mixture of the doping liquid and the fluid of the condensed process.

Auxiliary fluid: the fluid (liquid or gaseous) that goes through the heat exchanger shell (20) and includes any type of cooling or heating fluid depending on the operation of the device.

In an embodiment of the invention, the condensing process is the following: through a first inlet (101a) enters the Process fluid in gas phase, which expands by the chamber formed between the heat exchanger (20) and the lid (60). The pressure carried by the Process fluid in gas phase directs the same towards the inlet region (21) of the heat exchanger (20). Once the Process fluid in gas phase is inside the bundle of tubes, the transfer of heat between the Auxiliary fluid and the external surface of the tubes and shell begins. When heat transfer takes place between the inner surface of the tubes and the Process fluid in gas phase into the tubes, a portion of the Process fluid in gas phase condenses and the Condensed process fluid is generated. The other portion of the Process fluid in gas phase that is not able to condense goes out through the exit region (22) up to the condensing chamber (30). In this condensing chamber (30) the Doping liquid, the Process fluid in gas phase and the Condensed process fluid come into direct contact, generating a thermal shock thanks to the difference in temperature between the fluids. In this way, another portion of the Process fluid in the gas phase is condensed, which is added to the Condensed process fluid. This mixture of Doping liquid and Condensed process fluid make up the Process fluid in liquid phase, which increases in quantity as more Process fluid in the gas phase condenses in the condensing chamber (30). As the amount of Process fluid in liquid phase increases, it rises on the outer surface of the shell, which is at a different temperature from the Process fluid in liquid phase. In this way a heat transfer is generated between the outer surface of the shell, the Process fluid in liquid phase and the inner surface of the first container. On the other hand, due to the stirrer (40), the temperature of the Process fluid in liquid phase under the condensing chamber (30) is homogenized with the Process fluid in liquid phase in contact with the external wall of the shell. This contributes to the condensing of the process fluid in gas phase that enters the condensing chamber (30). Finally, the Process fluid in the liquid phase exits the condenser through the outlet opening (102a).

In accordance with the embodiment described above, finding a portion of the Process fluid in gas phase in the form of bubbles with the moving blades of the stirrer (40) allows these bubbles to break and condense part of their content by the action of the movement and thermal shock with the process fluid in liquid phase. The non-condensing portion of the bubbles remains on the surface of the process fluid in liquid phase and exits through the outlet opening (102a). This outlet opening (102a) allows the outlet of the condensation device (100) of the process fluid in gas phase that was not able to condense and of the process fluid in liquid phase which, as it increases, overflows the outlet opening (102a) and flows through it. Moreover, the outlet opening (102a) also allows atmospheric pressure to be kept in the condensation device (100).

Both the condensation device (100) and the distillation device (300) previously detailed have great versatility of uses. These can be used in processes to obtain drinking water, to desalinate water, to obtain alcoholic beverages, medicines, food, perfumes, solvents, fuels, biofuels, salts, among others. The following will explain the embodiments of the devices related to different applications:

In an embodiment of the invention, the condensation device (100) or the distillation device (300) comprises a doping liquid housed in the condensing chamber (30) or in one of the containers. The use of a doping liquid facilitates the condensing of gases, because when they come into contact with this liquid, their temperature decreases and a percentage of the gases pass into the liquid phase. Usually, the doping liquid has the same physicochemical properties as the already condensed fluid. In an embodiment of the invention, the condensing chamber (30) houses the doping liquid and at least part of the stirrer (40) is immersed in this liquid, when the stirrer (40) is located in the condensing chamber (30).

In any of the embodiments of the invention, different elements that complement its operation are connected to the condensation device (100) or to the distillation device (300) such as storage tanks of substances, pumps and valves.

Pumps are selected for example from single-stage or multi-stage centrifugal pumps, positive displacement pumps, diaphragm pumps, piston pumps and others known to a normally skilled person.

On the other hand, valves are used to regulate the transit of fluids in the system and are selected for example from the group consisting of unidirectional valves, ball valves, butterfly valves, knife valves, guillotine valves, needle valves, curtain valves, servo valves, solenoid valves, valves operated by a control system or combinations thereof.

In an embodiment of the distillation device (300), the reactor (200) is connected to the condensation device (100) by means of a precondensation device (100a). This precondensation device (100a) is selected from the group composed of distillation columns, rectification towers, reflux towers, fractionation towers, fractional distillation columns, precondensing equipment, condensation devices (100) such as that of the present invention, other precondensation devices (100a) known to a normally skilled person, or combinations thereof.

In an embodiment of the invention, at least one condensation device (100) is used as a precondensation device (100a). If required, two or more condensation devices (100) connected by means of their first inlets (101a) and outlet openings (102a) are used, as it is possible that a reactor (200) requires more than one condensation device (100) to condense all the gases it produces.

Optionally, any of the aforesaid embodiments of the invention, and in the following examples, may include measuring devices to measure variables inside the condensation device (100) or the reactor (200), such as pressure, humidity, temperature, content volume, among others. These measuring devices can be selected from the group consisting of manometers, hygrometers, thermometers, level indicators, pH meters, among others. An example of this can be seen in FIG. 12, where there is a pressure gauge (260) indicating the pressure inside the reactor (200).

On the other hand, different elements to control flow, pressure, humidity, temperature, or content volume, can be included in any of the embodiments of the invention. An example of this is illustrated in FIG. 12, which includes a flow valve (410) arranged in the duct (400), which regulates the flow of fluid between the reactor (200) and the condensation device (100) allowing to control the entry of gases or liquids to the condensation device (100). A safety valve (270) is also added to the reactor (200), which allows the pressure inside the reactor (200) to be reduced when it exceeds a preset limit, avoiding the failure of the reactor (200) or the duct (400).

Moreover, in an embodiment of the invention which includes a flow valve (410) arranged in the duct (400), there is a safety valve (270) which connects the reactor (200) to the condensation device (100). This safety valve (270) allows to relieve the pressure of the reactor (200) in the condensation device (100), to reduce the risk of malfunction, in case the duct (400) or the flow valve (410) is blocked or fails in any way, and to prevent the loss of the process fluid in the gas phase. Optionally, the safety valve (270) is connected to the reactor (200) and the condensation device (100) via ducts.

Example 1

With reference to FIG. 7, a condensation device (100) with the following features was built and designed:

The condensation device (100) included a lid (60) connected to a first double-walled container (10), a second double-walled container (50) also connected to the first container (10), a heat exchanger (20) of tubes and shell housed inside the containers (10 and 50), a condensing chamber (30) under the heat exchanger (20) of tubes and shell, and a stirrer (40) located in that condensing chamber (30).

This lid (60) had a first inlet (101a) for gases and a second inlet (101b) (not visible in said FIG. 7) for monitoring or other actions. Under the lid (60) a chamber was configured where the fluid in gas state accumulates before entering the heat exchanger (20).

In the cavity formed between the outer jacket (51) and the inner jacket (52) of the second container (50) a heat source was housed. In order to monitor, locate or feed this heat source, a second container flange (53) was fitted to an opening in the outer jacket (51). For its part, the stirrer (40) was configured with blades that enter the condensing chamber (30) and protrude from it. On the other hand, an outlet opening (102a), through which the condensed fluid exits, was located in the first container (10).

Example 2

Referring to FIG. 10, a distillation device (300) was designed for the recovery of drinking water with the following features:

The condensation device (100) detailed in the previous example was used, and was connected by means of a duct (400) to a reactor (200). The reactor (200) consisted of a four-blade mixer. The reactor (200) consisted of a first receptacle (210) and a second double-walled receptacle (250), plus a mixer (240). The second receptacle (250) of the reactor (200) housed biomass as fuel.

Taking into account the elements described above, the following are the steps required to carry out the recovery of drinking water from salt water using the distillation device (300):

Fill the reactor (200) completely with sea water, drinking water is used as a doping liquid and the condensing chamber region (30) is filled. One of the functions of drinking water is to receive the Process fluid in gas phase, which in this case is mainly water steam that does not condense in the heat exchanger (20) of tubes and shells. Additionally, this doping liquid is used to start the operation of the condensation device (100), after this first operation the distillation device (300) will produce by itself drinking water.

After the reactor (200) filling is complete, the salt water is heated and completely evaporated. Once the water reaches its boiling point (90° C.-100° C.) it changes to a gas phase; this process fluid in gas phase is led through the duct (400) to the condensation device (100).

The steam is directed to the heat exchanger (20) of tubes and shell where a fraction of this Process fluid in gas phase condenses into drinking water, being of the same nature as the condensing chamber (30) doping liquid. Drinking water receives steam that did not condense in the heat exchanger (20) of tubes and shell and reaches the condensing chamber (30), where another portion of the process fluid is condensed in the gas phase with the help of the stirrer (40). The remaining fluid portion of the process in gas phase, leaves the condensing chamber (30) and goes up the outer surface of the shell (23) of the heat exchanger (20) of tubes and shell and the inner wall (12) of the first container (10), which, being at a lower temperature they condense another portion of the process fluid in gas phase transforming it into drinking water.

In another possible example of the invention, a distillation device (300) for the recovery of drinking water includes a second condensation device (100) used as a precondensation device (100a) connected by means of a conduit to the first condensation device (100). The precondensation device (100a) and the reactor (200) are connected by means of a duct (400). This embodiment can be seen illustrated in FIG. 11

Example 3

With reference to FIG. 11 and taking into account the elements described above and their possible variations, the steps required to carry out the recovery of hydrocarbons from plastic materials, and natural oils and greases using the distillation device (300) of the present invention are listed below:

1. Fill the reactor (200) with shredded, clean and dry plastic. The types of plastic material that receives the device of invention are: HDPE (high density polyethylene), LDPE (low density polyethylene), PP (polypropylene), and PS (polystyrene). Moreover, a catalyst substance is added that can be Aluminum Silicate with Sodium, which corresponds to 5% to 10% of the weight of the inserted plastic. Preferably the recycled plastic material entering the device is of only one type. However, it is possible to make combinations.

2. After completely filling the reactor (200) with plastic material, the condensing chamber region (30) is filled with Mixoil as a doping liquid. One of the functions of the Mixoil is to receive gases that do not condense in the heat exchanger (20) of tubes and shell. Additionally, this Mixoil is used to start the condensation device (100) operation, after this first operation the distillation device (300) will produce by itself the Mixoil, which is composed of 25%-35% gasoline, 35%-45% diesel, 10%-15% kerosene and 5%-15% other substances.

3. Heat the plastic material inside the reactor (200) by means of a heat source. Once the plastic material melts, it decreases to half its initial volume, so the reactor (200) is turned off and preferably more solid plastic material is filled.

4. After the reactor (200) filling is completed, the entire plastic material is heated and melted. Subsequently, the mixer (240) of the reactor (200) is turned on. Once the plastic material in liquid state reaches (240° C.-420° C.) it changes to gas phase, these gases are led through the duct (400) to the condensation device (100). These gases previously pass through an additional condensation device (100), used as a precondensation device (100a), the precondensation device (100a) and the reactor (200) were connected by means of a duct (400). The condensation device (100) and the precondensation device (100a) were connected by means of a duct (400a).

5. The gases are directed to the heat exchanger (20) of tubes and shells wherein a fraction of these are condensed into Mixoil, the same oil found in the region of the condensing chamber (30). The doping liquid, i.e. the Mixoil, receives the gases that did not condense in the heat exchanger (20) of tubes and shells and that reach the condensing chamber (30), where another portion of the gases is condensed with the help of the stirrer (40). The remaining portion of gases leaves the condensing chamber (30) and goes up the outer surface of the shell (23) of the heat exchanger (20) of tubes and shell and the inner wall (12) of the first container (10), which at a lower temperature condense another portion of the gases.

6. Gasoline, diesel, and kerosene can be obtained from the Mixoil generated by a method similar to that described above and using the distillation device (300) of the present invention.

Example 4

Taking into account the elements described above and their possible variations, the steps required to carry out a transesterification process in the condensation device (100) are listed below:

1. Place natural oils and fats in the condensation device (100) as doping liquid, filling the region of the condensing chamber (30). These natural oils and greases correspond to vegetable oils, animal fats or lubricants manufactured from chemically modified hydrocarbons, with or without previous use. Preferably these natural oils and fats have been previously filtered.
2. Heat natural oils and fats by means of a heat source inside the condensation device (100) in order to dehydrate them. The temperature of these natural oils and fats is between 80° C. and 120° C.
3. Bring the temperature of natural oils and fats to between 50° C. and 70° C.
4. Using the stirrer (40), mix the natural oils and fats, add an alcohol-catalyst such as sodium methoxide or ethoxide as the natural oils and fats are agitated in the condensation device (100) and heated until biodiesel is obtained with a glycerin deposit.
5. Extract the glycerin deposit through the 102b duct to separate it from the biodiesel.

Example 5

With reference to FIG. 11 and taking into account the elements described above and their possible variations, the steps required to carry out the recovery of fuels from natural oils and fats by means of a transesterification process and the recovery of fuels from plastic by means of catalytic depolymerization without pressure are listed below:

1. Obtain biodiesel, by means of the following steps:
   a) Have natural oils and fats as doping liquid inside the condensing (100) and precondensing (100a) device, filling the region of the condensing chamber (30). These natural oils and greases correspond to vegetable oils, animal fats or lubricants manufactured from chemically modified hydrocarbons, with or without previous use. Preferably these natural oils and fats have been previously filtered.
   b) Heat natural oils and fats by means of a heat source inside the condensing (100) and precondensing (100a) device in order to dehydrate them. The temperature of these natural oils and fats is between 80° C. and 120° C.
   c) Bring the temperature of natural oils and fats to between 50° C. and 70° C.
   d) Using the stirrer (40), mix the natural oils and fats, add an alcohol-catalyst such as sodium methoxide or ethoxide as the natural oils and fats are agitated in the condensing (100) and precondensing (100a) device and heated until biodiesel is obtained with a glycerin deposit.
   e) Extract the glycerin deposit through the 102b duct to separate it from the biodiesel. This biodiesel will be used as a doping liquid in the condensing chamber region (30). One of the functions of biodiesel is to receive gases that are not able to condense in the heat exchanger (20) of tubes and shell.

2. Fill the reactor (200) with shredded, clean and dry plastic. The types of plastic material that receives the device of invention are: HDPE (high density polyethylene), LDPE (low density polyethylene), PP (polypropylene), and PS (polystyrene). Moreover, a catalyst substance is added that can be Aluminum Silicate with Sodium, which corresponds to 5% to 10% of the weight of the inserted plastic. Preferably the recycled plastic material entering the device is only of one type. However, it is possible to make combinations.

3. Heat the plastic material inside the reactor (200) by means of a heat source. Once the plastic material melts, it decreases to half its initial volume, so the reactor (200) is turned off and preferably more solid plastic material is filled.

4. After filling the reactor (200) is completed, the entire plastic material is heated and melted. Subsequently, the mixer (240) of the reactor (200) is turned on. Once the plastic material in liquid state reaches (240° C.-420° C.) it changes to gas phase, these gases are led through the duct (400) to the condensation device (100). These gases previously pass through an additional condensation device (100), used as a precondensation device (100a), the precondensation device (100a) and the reactor (200) were connected by means of a duct (400). The condensation device (100) and the precondensation device (100a) were connected by means of a duct (400a).

5. The gases are directed to the heat exchanger (20) of tubes and shells where a fraction of these are condensed and transformed into Mixoil. This Mixoil is mixed with the doping liquid, i.e. the biodiesel receives the gases that did not manage to condense in the heat exchanger (20) of tubes and shells and that reach the condensing chamber (30), where another portion of the gases is condensed with the help of the stirrer (40).

The remaining portion of gases leaves the condensing chamber (30) and goes up the outer surface of the shell (23) of the heat exchanger (20) of tubes and shell and the inner wall (12) of the first container (10), which at a lower temperature condense another portion of the gases. The distillation device (300) alone produces Mixoil mixed with the doping liquid corresponding to biodiesel. Mixoil is composed of 25%-35% gasoline, 35%-45% diesel, 10%-15% kerosene and 5%-15% other substances.

6. Finally, Mixoil and biodiesel are mixed in the precondensation device (100a) and in the condensation device (100) and the device of this invention is switched off. In this way, hydrocarbons are obtained from the transesterification of natural oils and fats and the catalytic depolymerization of the plastic without pressure.

It must be understood that the present invention is not limited to the embodiments described and illustrated, given as it will be evident for a skilled person in the art, there are possible variations and modifications that do not depart from the spirit of the invention, which is only defined by the following claims.

The invention claimed is:

1. A condensation device (100) comprising:
a first container connected to a second container;
a heat exchanger housed inside the first container, the heat exchanger having an inlet region and an outlet region; and
a condensing chamber below the heat exchanger and housed in the second container;
wherein, the condensing chamber is located in the outlet region of the heat exchanger; and
wherein, the second container consists of an outer jacket and an inner jacket and is located below the outlet region, the inner jacket is located below the condensing chamber and houses a stirrer, and the outer jacket houses the inner jacket.

2. The device of claim 1, wherein the heat exchanger is comprised of tubes and a shell.

3. The device of claim 1, where the stirrer is arranged in the condensing chamber.

4. The device of claim 1, where the first container is double-walled.

5. The device of claim 1, comprising a heat source in contact with the second container.

6. The device of claim 1, wherein the first container and the second container include a first container flange and a second container flange arranged respectively on the surfaces of those containers, for the entry and exit of substances in and out of both containers and in and out of the heat exchanger.

7. The device of claim 1, wherein the stirrer is connected to a shaft that runs lengthwise through the heat exchanger, said stirrer being located in the condensing chamber.

8. The device of claim 3, wherein the stirrer is connected to a power transmission mechanism.

9. The device of claim 1, wherein the first container is connected to a reactor.

10. The device of claim 9, wherein the reactor includes a flange arranged on a surface, for the entry and exit of substances.

11. A distillation device comprising:
a condensation device consisting of:
a first container connected to a second container;
a heat exchanger of tubes and shells housed inside the first container, the heat exchanger having an inlet region and an outlet region; and
a condensing chamber located below the outlet region of the heat exchanger and housed in the second container;
where the second container consists of an outer jacket and an inner jacket and is located below the outlet region of the heat exchanger, the inner jacket is located below the condensing chamber and houses a stirrer, and the outer jacket houses the inner jacket;
a reactor connected to the first container.

12. The distillation device of claim 11, where the reactor comprises:
a first receptacle connected by means of a duct to the first container of the condensation device; and
a second receptacle consisting of an inner sheet and an outer sheet and being coaxial to the first receptacle, where the outer sheet houses the inner sheet.

13. The distillation device of claim 12, wherein the duct is connected to a flow valve and the reactor is connected to a safety valve arranged in the duct.

14. The distillation device of claim 12, wherein the duct is connected to a flow valve and the reactor and the condensation device are connected by means of a safety valve.

15. The distillation device of claim 11, where the reactor is connected to the condensation device by means of a precondensation device.

16. The device of claim 11, used within a transesterification system that recovers biofuels from natural oils and fats, and in a distillation system that recovers fuels from plastic.

* * * * *